(12) United States Patent
Rickman et al.

(10) Patent No.: US 6,212,320 B1
(45) Date of Patent: Apr. 3, 2001

(54) COUPLING OPTICAL FIBRE TO WAVEGUIDE

(75) Inventors: Andrew George Rickman, Wiltshire; Arnold Peter Roscoe Harpin, Oxford; James Stuart McKenzie, Middlesex; John Paul Drake, Berkshire; Emma Jane Clarissa Dawnay, Wiltshire, all of (GB)

(73) Assignee: Bookham Technology PLC, Oxfordshire (GB)

( * ) Notice: Subject to any disclaimer, the term of this patent is extended or adjusted under 35 U.S.C. 154(b) by 0 days.

(21) Appl. No.: 09/298,839

(22) Filed: Apr. 26, 1999

(30) Foreign Application Priority Data

May 1, 1998 (GB) ................................................. 9809460

(51) Int. Cl.⁷ ........................................................ G02B 6/30
(52) U.S. Cl. .............................. 385/49; 385/52; 385/50; 385/88
(58) Field of Search ................................ 385/49, 50, 52, 385/88

(56) References Cited

U.S. PATENT DOCUMENTS

| | | | |
|---|---|---|---|
| 4,948,219 | * | 8/1990 | Seino et al. ............................. 385/95 |
| 5,046,808 | * | 9/1991 | Chang ..................................... 385/13 |
| 5,479,547 | * | 12/1995 | Kunikane ............................... 385/47 |
| 5,548,673 | * | 8/1996 | Kitamura et al. ...................... 385/49 |
| 5,787,214 | * | 7/1998 | Harpin et al. .......................... 385/49 |

FOREIGN PATENT DOCUMENTS

| | | |
|---|---|---|
| 0283301 A2 | 9/1983 | (EP) . |
| 0572604 A2 | 2/1993 | (EP) . |
| 2239102 | 6/1991 | (GB) . |
| WO 97/42534 * | 11/1997 | (WO) .............................. G02B/6/30 |

* cited by examiner

Primary Examiner—Darren Schuberg
Assistant Examiner—Fayez Assaf
(74) Attorney, Agent, or Firm—Fleshner & Kim, LLP

(57) ABSTRACT

An apparatus is provided for coupling an optical fibre to a waveguide on an optical chip, the apparatus comprises a recess in the chip for receiving the optical fiber, the recess comprising a V-groove the side faces of which locate the position of the fiber in directions perpendicular to the optical axis of the fiber so as to position the fibre in alignment with the waveguide, and an end face adjacent the end of the waveguide, the end face of the recess being substantially flat and substantially perpendicular to the plane of the chip with its normal inclined to the optical axis of the waveguide so an optical fiber having an inclined end face can be brought into a close, abutting relationship with the end of the waveguide and brought into rotational alignment therewith about its optical axis by positioning the fiber so its inclined end face lies in planar contact with the end face of the recess.

20 Claims, 3 Drawing Sheets

COUPLING OPTICAL FIBRE TO WAVEGUIDE

BACKGROUND OF THE INVENTION

1. Field of the Invention

This invention relates to apparatus for coupling an optical fibre to a waveguide on an optical chip.

2. Description of the Prior Art

Many different arrangements have been proposed and used for coupling an optical fibre to a waveguide integrated on an optical chip to ensure that the fibre and waveguide are positioned in alignment with each other and to provide a low-loss coupling for the transmission of optical signals from the fibre to the waveguide and vice versa.

One known method of coupling a fibre to a waveguide is disclosed in WO97/42534. In this arrangement, a V-groove is provided in a silicon-on-insulator chip. Due to the manner in which the V-groove is etched, the end face of the groove is not perpendicular to the plane of the chip but is inclined thereto. Accordingly, in order to enable a close, abutting relationship between the end of the fibre and the end of the waveguide to be provided, the waveguide is constructed so as to overhang the inclined end face of the groove. This arrangement works well in many situations but in some applications there is concern that the overhanging portion of the waveguide may not be sufficiently robust to withstand harsh conditions to which it may be subjected.

The invention aims to provide an alternative arrangement which is likely to be more robust yet is still simple, easy to fabricate and facilitates passive alignment of the fibre with the waveguide.

SUMMARY OF THE INVENTION

According to the present invention, there is provided apparatus for coupling an optical fibre to a waveguide on an optical chip, the apparatus comprising a recess in the chip for receiving the optical fibre, the recess comprising a V-groove the side faces of which locate the position of the fibre in directions perpendicular to the optical axis of the fibre so as to position the fibre in alignment with the waveguide, and an end face adjacent the end of the waveguide, the end face of the recess being substantially flat and substantially perpendicular to the plane of the chip with its normal inclined to the optical axis of the waveguide so an optical fibre having an inclined end face can be brought into a close, abutting relationship with the end of the waveguide and brought into rotational alignment therewith about its optical axis by positioning the fibre so its inclined end face lies in planar contact with the end face of the recess.

Preferred and optional features of the invention will be apparent from the following description and from the subsidiary claims of the specification.

BRIEF DESCRIPTION OF THE DRAWINGS

The invention will now be further described, merely by way of example, with reference to the accompanying drawings, in which.

DETAILED DESCRIPTION OF THE INVENTION

Figure 1:
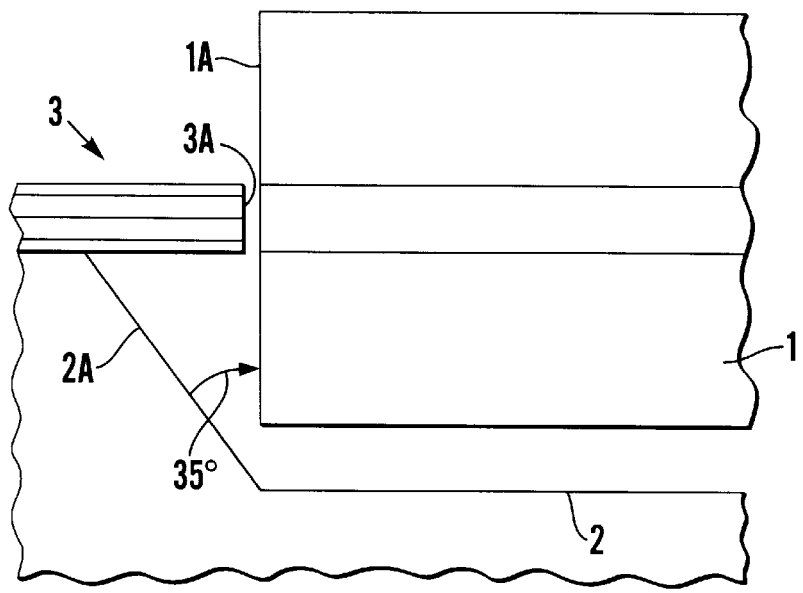
FIG. 1 is a schematic diagram showing the prior art arrangement as described in WO97/42534.

FIG. 1 shows an optical fibre 1 located in a V-groove 2 in a silicon-on-insulator chip in alignment with a rib waveguide 3 formed in the upper silicon layer of the chip and shows how the waveguide overhangs the inclined end face 2A of the V-groove so as to enable the end face 1A of the fibre to be brought into a close, abutting relationship with the end face 3A of the waveguide 3.

It should be noted that "close abutting relationship" as used herein means either that the respective faces are in contact with each other, or are positioned very close to each other (e.g. less than 15 microns apart) so as to provide a low loss optical coupling therebetween. The optical loss associated with the coupling should preferably be 1 dB or less.

It should also be noted that "alignment" between the waveguide and optical fibre as used herein means that the end faces thereof are in alignment so as to provide a low loss optical coupling therebetween. As described further below, the optical axes of the waveguide and optical fibre are not usually aligned, in the sense of being co-axial, with each other.

Figure 2:
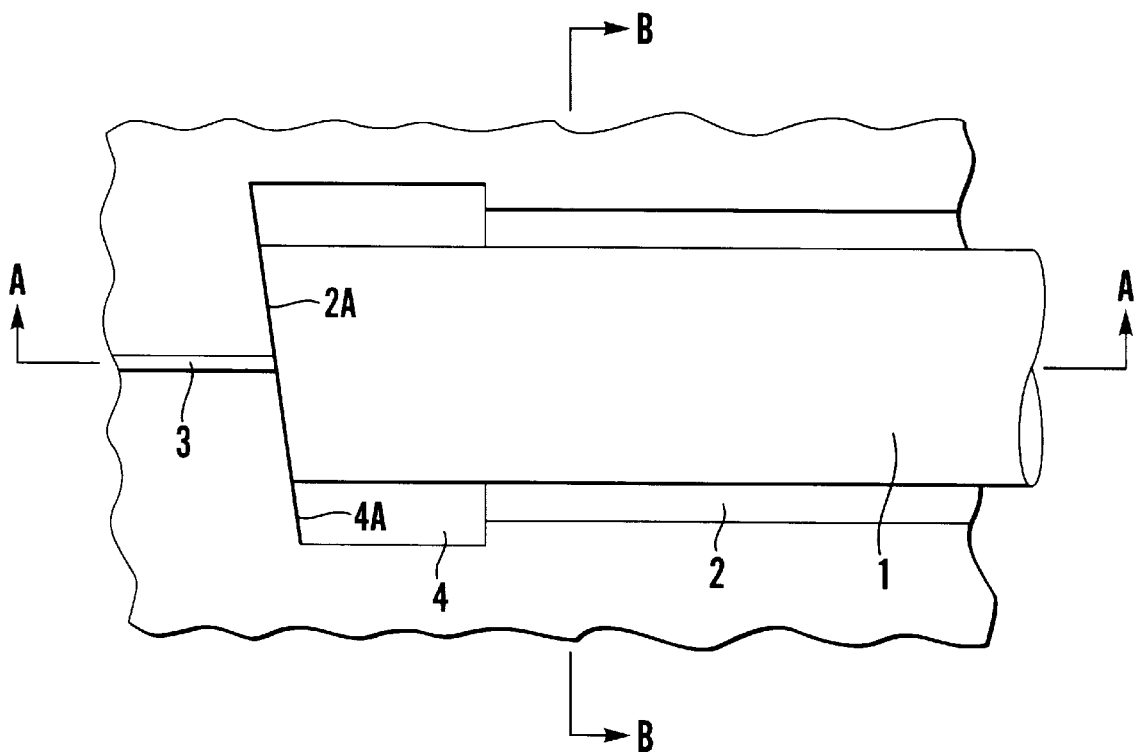
FIG. 2 is a schematic plan view of apparatus according to an embodiment of the invention.
Figure 3:
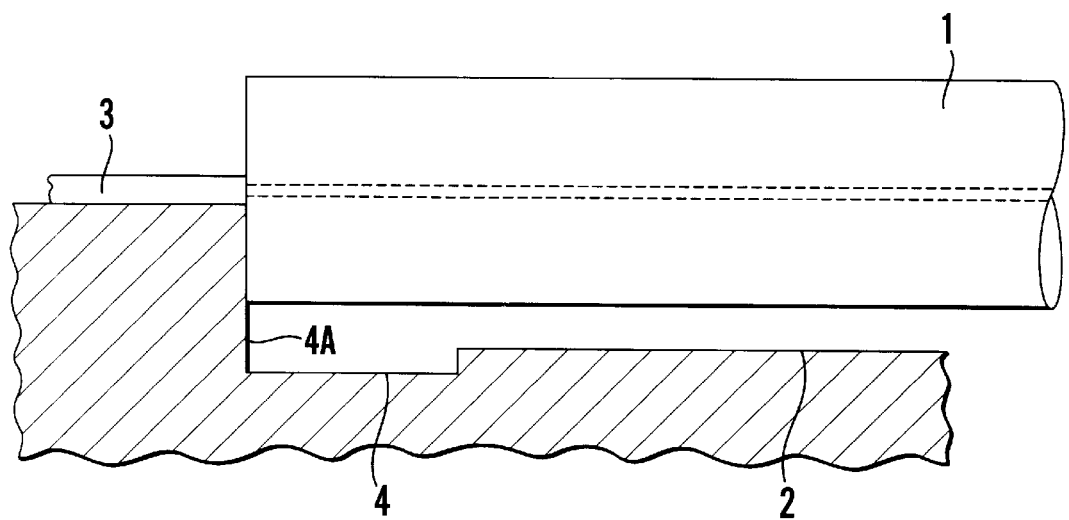
FIG. 3 is a cross-sectional view taken along line A—A of FIG. 2.

In the arrangement shown in FIGS. 2 and 3, a fibre 1 is located in a recess which comprises two portions, a first portion of which comprises locating means, in the form of a V-groove 2 and a second portion of which provides an end face which is perpendicular to the plane of the chip and the normal of which is inclined to the optic axis of the waveguide 3. This end face may be provided by first fabricating the V-groove 2 in the conventional manner, i.e. by a wet, anisotropic etching process, and then carrying out a dry, anisotropic etch, e.g. a plasma etch, through a substantially rectangular mask at the end of the V-groove 2 so as to remove the inclined end face at the end of the V-groove and form the second portion 4 of the recess (hereinafter referred to as the recess 4), a side wall 4A of which provides the said vertical end face.

FIGS. 2 and 3 show the recess 4 formed by this dry etch process as being slightly wider and slightly deeper than the V-groove 2 but this need not be the case as long as sufficient material is removed to enable an optical fibre 1 located in the V-groove 2 being slid along the groove 2 so an end face 2A of the fibre can be brought into a close, abutting relationship with the vertical face 4A of the recess 4.

As shown in FIGS. 2 and 3, the rib waveguide 3 terminates at the vertical face 4A. Alternatively, the end of the waveguide 3 may be set back slightly from the vertical face 4A as described below in relation to FIG. 4. The waveguide 3 does not, therefore, need to overhang the recess 4 in order for the end of the fibre 1 to be brought into a close, abutting relationship therewith.

The recess 4 also acts as a well for receiving and locating adhesive and/or solder for securing the fibre 1 in place and thus helps prevent adhesive or solder finding its way to the fibre/waveguide interface.

Figure 4:
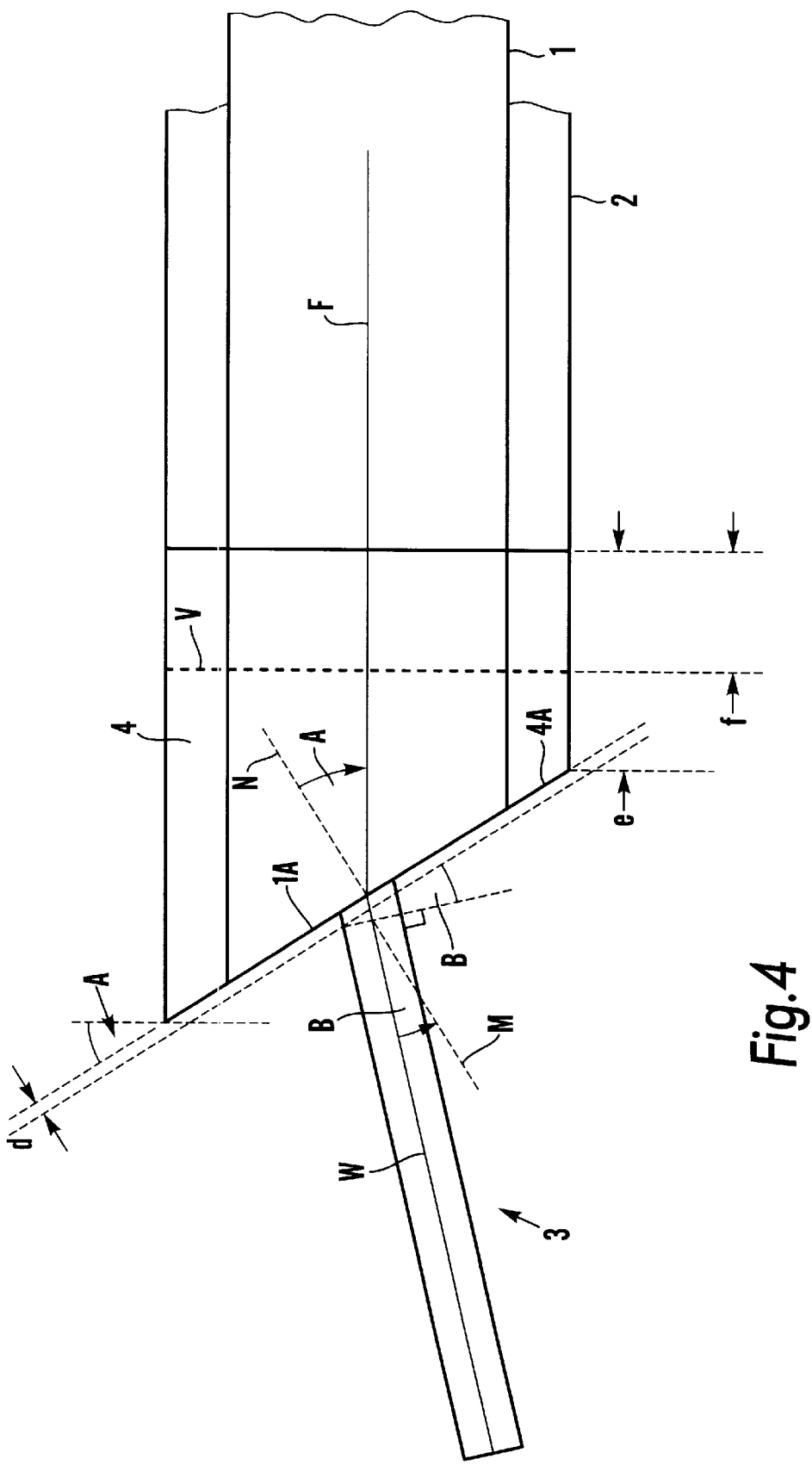
FIG. 4 is an enlarged, schematic, plan view corresponding to FIG. 2 showing features thereof in more detail.

FIG. 4 shows an enlarged version of the plan view of FIG. 2 with the angles of the inclined faces exaggerated. As shown in FIG. 4 the end face 1A of the fibre 1 is not perpendicular to the optical axis F of the fibre 1 but its normal N is inclined thereto by an angle A, which is typically about 7 degrees. Similarly, the end face 3A of the waveguide 3 has a normal M inclined to the optical axis W of the waveguide 3 by an angle B, which is typically about 3 degrees. The waveguide 3 and V-groove 2 are also fabricated with their axes inclined by 4 degrees, so the optical axis F of the fibre 1 is inclined to the optical axis W of the waveguide by 4 degrees. Accordingly, the end faces 1A and 3A of the fibre and waveguide lie parallel to each other.

The normals of the end faces of the fibre 1 and the waveguide 3 are inclined to the respective optical axes thereof in order to reduce back reflection from the interface between the respective items and the surrounding environment and the angles are selected in dependence upon the refractive indices of the waveguide 3 and optical fibre 1 so that light travelling along the waveguide is refracted so as to travel along the optical axis F of the fibre 1 in accordance with Snell's Law. It is, therefore, important for the fibre 1 to be in the appropriate rotational orientation about its optical axis F so the end face of the fibre 1 lies in the appropriate rotational alignment with the end face of the waveguide 3. This is achieved by forming the end face 4A of the recess 4 at an angle corresponding to the fibre cleave angle, i.e. the normal of the end face 4A also lies at an angle A to the longitudinal axis of the groove 2, so that by positioning the fibre 1 with its inclined end face 1A lying in planar contact with the end face 4A of the recess 4, the end face 1A of the fibre is in the appropriate rotational alignment with, and lies in close, abutting relationship with the end face 3A of the waveguide.

The end face 3A of the waveguide 3 is preferably set back from the end face 4A of the recess 4 by a small distance d, e.g. of about 4 microns, to allow for misalignments of lithographic masks during fabrication of the device and to protect the end face 3A of the waveguide from impact with the fibre 1 when the fibre is slid along the groove 2 into contact with the end face 4A.

If desired, a refractive index matching compound may be used in the gap between the end face 3A of the waveguide and the end face 1A of the fibre, matched to the refractive index of the fibre.

As indicated above, the facet angle B at the end of the waveguide 3 is typically 3 degrees for a silicon rib waveguide to reduce back reflections therefrom. Other angles may, however, be used, e.g. up to 9 degrees.

The cleave angle A of the fibre for use with a silicon waveguide 3 having a facet angle of 3 degrees, would typically be approximately 7 degrees. Other cleave angles may, however, be used as appropriate. In each case, however, these angles are arranged so that light travelling along the optical axis of the waveguide is refracted so as to travel along the optical axis of the fibre in accordance with Snell's Law.

The dotted line V shown in FIG. 4 indicates the original end of the V-groove, i.e. where the inclined end face 2A thereof meets the upper surface of the chip prior to formation of the recess 4 (and thus indicates the position of the end of the mask through which the V-groove is etched). The recess 4 is formed so as to overlap the end of the V-groove 2 by a distance f which is sufficient to remove enough of the inclined end face 2A to prevent it touching the underside of the fibre. The distance f would typically be in the range substantially 0.35 to 0.5 times the fibre diameter, i.e with a fibre having a diameter of about 125 microns, f would be in the range 45 to 60 microns. It will be appreciated that all of the inclined end face 2A need not necessarily be removed as the fibre 1 is supported in the V-groove with its underside spaced from the bottom of the V-groove (see FIGS. 1 and 5) although, in practice, the dimension f will usually be sufficient to remove all of the inclined end face (as shown in FIG. 3).

The length e of the recess 4 (see FIG. 4) is typically slightly greater than the length f to allow for misalignment of the lithographic mask and other fabrication tolerances and with a fibre having a diameter of about 125 microns would typically be in the range of 50 to 65 microns.

It should also be noted that the recess 4 may be formed first and the V-groove 2 formed after the recess 4 has been etched, so long as the positions of the masks used to etch the recess 4 and the V-groove overlap by the distance f as discussed above.

Figure 5:
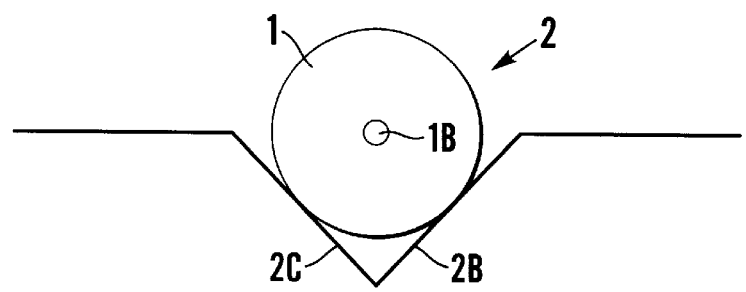
FIG. 5 is a cross-sectional view taken along line B—B of FIG. 2.

FIG. 5 is a cross-sectional view taken along line B—B of FIG. 2 and shows a cross-section through the V-groove 2. As shown in this Figure, the optical fibre 1 is supported on the side faces 2B and 2C of the V-groove which thus locates the position of the fibre in two orthogonal directions, i.e. vertically and horizontally, so that the core 1B of the fibre is aligned with the waveguide 3. The location of an optical fibre in a V-groove in this manner is known.

The part of the optical fibre 1 extending across the recess 4 will be unsupported but as the length of this part is typically 65 microns or less, this is of no sequence.

It will be appreciated that the arrangement described above provides a more rugged construction than the prior art in which a portion of the waveguide overhangs the end of the V-groove.

As described above, the device is preferably provided on a silicon chip and most preferably on a silicon-on-insulator chip.

We claim:

1. Apparatus for coupling an optical fibre to a waveguide on an optical chip, the apparatus comprising a recess in the chip for receiving the optical fibre, the recess comprising a V-groove the side faces of which locate the position of the fibre in directions perpendicular to the optical axis of the fibre so as to position the fibre in alignment with the waveguide, and an end face adjacent the end of the waveguide, the end face of the recess being substantially flat and substantially perpendicular to the plane of the chip with its normal inclined to the optical axis of the waveguide so an optical fibre having an inclined end face can be brought into a close, abutting relationship with the end of the waveguide and brought into rotational alignment therewith about its optical axis by positioning the fibre so its inclined end face lies in planar contact with the end face of the recess, wherein the recess comprises two portions, a first portion which includes the V-groove and a second portion which includes said end face, the width of the second portion being at least as great as the width of the first portion.

2. Apparatus as claimed in claim 1 in which the end face of the recess is inclined to the optical axis of the waveguide by a first angle (B) of up to 9 degrees, and preferably at an angle of substantially 3 degrees.

3. Apparatus as claimed in claim 2 in which, when the said first angle (B) is substantially 3 degrees, the end face of the recess is inclined to the optical axis of the waveguide by a second angle (A) of substantially 7 degrees.

4. Apparatus as claimed in claim 1, in which the end of the waveguide is spaced from the end face of the recess, preferably by a distance of up to 4 microns.

5. Apparatus as claimed in claim 1, in which the optical chip comprises silicon, and is preferably a silicon-on-insulator chip.

6. Apparatus for coupling an optical fibre to a waveguide on an optical chip, the apparatus comprising a recess in the chip for receiving the optical fibre, the recess comprising a V-groove the side faces of which locate the position of the fibre in directions perpendicular to the optical axis of the fibre so as to position the fibre in alignment with the waveguide, and an end face adjacent the end of the waveguide, the end face of the recess being substantially flat and substantially perpendicular to the plane of the chip with its normal inclined to the optical axis of the waveguide so an optical fibre having an inclined end face can be brought into a close, abutting relationship with the end of the waveguide and brought into rotational alignment therewith about its optical axis by positioning the fibre so its inclined end face lies in planar contact with the end face of the recess, wherein the recess comprises two portions, a first portion which includes the V-groove and a second portion which includes said end face, and wherein the second portion of the recess has a length, in a direction parallel to the axis of the locating means, of at least 0.35 and preferably in the range 0.35 to 0.5 times the diameter of the optical fibre.

7. Apparatus as claimed in claim 6, wherein the end face of the recess is inclined to the optical axis of the waveguide by a first angle (B) of up to 9 degrees, and preferably at an angle of substantially 3 degrees.

8. Apparatus as claimed in claim 7, wherein when said first angle (B) is substantially 3 degrees, the end face of the recess is inclined to the optical axis of the waveguide by a second angle (A) of substantially 7 degrees.

9. Apparatus as claimed in claim 6, wherein the end of the waveguide is spaced from the end face of the recess, preferably by a distance of up to 4 microns.

10. Apparatus as claimed in claim 6, wherein the optical chip comprises silicon, and is preferably a silicon-on-insulator chip.

11. Apparatus for coupling an optical fibre to a waveguide on an optical chip, the apparatus comprising a recess in the chip for receiving the optical fibre, the recess comprising a V-groove the side faces of which locate the position of the fibre in directions perpendicular to the optical axis of the fibre so as to position the fibre in alignment with the waveguide, and an end face adjacent the end of the waveguide, the end face of the recess being substantially flat and substantially perpendicular to the plane of the chip with its normal inclined to the optical axis of the waveguide so an optical fibre having an inclined end face can be brought into a close, abutting relationship with the end of the waveguide and brought into rotational alignment therewith about its optical axis by positioning the fibre so its inclined end face lies in planar contact with the end face of the recess, wherein the recess comprises two portions, a first portion which includes the V-groove and a second portion which includes said end face, and wherein the first portion of the recess is formed by a wet etching process and the second portion of the recess is formed by a dry etching process.

12. Apparatus as claimed in claim 11, wherein the end face of the recess is inclined to the optical axis of the waveguide by a first angle (B) of up to 9 degrees, and preferably at an angle of substantially 3 degrees.

13. Apparatus as claimed in claim 12, wherein when said first angle (B) is substantially 3 degrees, the end face of the recess is inclined to the optical axis of the waveguide by a second angle (A) of substantially 7 degrees.

14. Apparatus as claimed in claim 11, wherein the end of the wave guide is spaced from the end face of the recess, preferably by a distance of up to 4 microns.

15. Apparatus as claimed in claim 11, wherein the optical chip comprises silicon, and is preferably a silicon-on-insulator chip.

16. Apparatus for coupling an optical fibre to a waveguide on an optical chip, the apparatus comprising a recess in the chip for receiving the optical fibre, the recess comprising a V-groove the side faces of which locate the position of the fibre in directions perpendicular to the optical axis of the fibre so as to position the fibre in alignment with the waveguide, and an end face adjacent the end of the waveguide, the end face of the recess being substantially flat and substantially perpendicular to the plane of the chip with its normal inclined to the optical axis of the waveguide so an optical fibre having an inclined end face can be brought into a close, abutting relationship with the end of the waveguide and brought into rotational alignment therewith about its optical axis by positioning the fibre so its inclined end face lies in planar contact with the end face of the recess, wherein the recess comprises two portions, a first portion which includes the V-groove and a second portion which includes said end face, the depth of the second portion being at least as great as the depth of the first portion.

17. Apparatus as claimed in claim 16, wherein the end face of the recess is inclined to the optical axis of the waveguide by a first angle (B) of up to 9 degrees, and preferably at an angle of substantially 3 degrees.

18. Apparatus as claimed in claim 17, wherein when said first angle (B) is substantially 3 degrees, the end face of the recess is inclined to the optical axis of the waveguide by a second angle (A) of substantially 7 degrees.

19. Apparatus as claimed in claim 16, wherein the end of the waveguide is spaced from the end face of the recess, preferably by a distance of up to 4 microns.

20. Apparatus as claimed in claim 16, wherein the optical chip comprises silicon, and is preferably a silicon-on-insulator chip.

* * * * *